(12) United States Patent
Lin

(10) Patent No.: US 7,428,147 B2
(45) Date of Patent: Sep. 23, 2008

(54) MOUNTING APPARATUS FOR STORAGE DEVICE

(75) Inventor: Yang-Ming Lin, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 295 days.

(21) Appl. No.: 11/321,587

(22) Filed: Dec. 29, 2005

(65) Prior Publication Data
US 2006/0231686 A1 Oct. 19, 2006

(30) Foreign Application Priority Data
Jan. 29, 2005 (CN) ............... 2005 2 0054534 U

(51) Int. Cl.
*G06F 1/16* (2006.01)
(52) U.S. Cl. .............. 361/685; 248/27.1; 361/726
(58) Field of Classification Search ............... 361/685, 361/726; 248/27.1
See application file for complete search history.

(56) References Cited

U.S. PATENT DOCUMENTS

| | | | |
|---|---|---|---|
| 5,262,923 A | 11/1993 | Batta et al. | |
| 5,599,080 A | 2/1997 | Ho | |
| 5,683,159 A | 11/1997 | Johnson | |
| 5,734,557 A | 3/1998 | McAnally et al. | |
| 6,385,036 B1 | 5/2002 | Chien | |
| 6,464,085 B1 * | 10/2002 | Chin et al. | ............. 211/26 |
| 6,771,496 B1 * | 8/2004 | Wu | ............. 361/685 |
| 6,853,549 B2 * | 2/2005 | Xu | ............. 361/685 |
| 2005/0078445 A1 * | 4/2005 | Chen et al. | ............. 361/685 |

FOREIGN PATENT DOCUMENTS

| | | |
|---|---|---|
| CN | 92232515.4 | 6/1993 |
| CN | 01130712.9 | 3/2003 |

* cited by examiner

*Primary Examiner*—Lisa Lea-Edmonds
*Assistant Examiner*—Ingrid Wright
(74) *Attorney, Agent, or Firm*—Morris Manning Martin LLP; Tim Tingkang Xia, Esq.

(57) ABSTRACT

A mounting apparatus includes a bracket (30), a retainer (50), and a slider (60). The bracket is for receiving a storage device (10) therein and includes a first sidewall (34) defining two pairs of apertures (344) therein. The slider is slidably attached to the first sidewall and includes two pairs of slideways (644), and a pair of resilient arms (623). The retainer is sandwiched between the first sidewall of the bracket and the slider and abutted against by the resilient arms. The retainer includes two pairs of posts (56) sliding along the slideways, and two pairs of pins (54) extending through the apertures to engage the storage device.

20 Claims, 5 Drawing Sheets

MOUNTING APPARATUS FOR STORAGE DEVICE

CROSS-REFERENCE TO RELATED APPLICATIONS

Relevant subject matter is disclosed in two co-pending U.S. Patent Applications respectively entitled "MOUNTING APPARATUS FOR STORAGE DEVICES" and "MOUNTING APPARATUS FOR STORAGE DEVICE", which are assigned to the same assignee of this application with application Ser. Nos. 10/951,425, and 11/200,828.

BACKGROUND

1. Field of the Invention

The present invention relates to a mounting apparatus, and more particularly to a mounting apparatus for a storage device.

2. General Background

The manufacture and assembly of electronic apparatuses have become increasingly more competitive. Manufacturers continually strive to improve the design and features of electronic apparatuses yet still offer competitive prices. One such area of improvement is mounting of devices in an electronic apparatus. An electronic apparatus, such as a typical desktop computer, a tower computer, a server, and the like, usually includes storage devices, such as hard disk drives, compact disk read-only memory (CD-ROM) drives, digital video disc (DVD) drives, floppy disk drives, and the like. These devices are typically added to increase the functionality of the electronic apparatus as desired by a user. However, the installation of such devices in the electronic apparatus is always labor-intensive.

For instance, as disclosed in China Patent No. 92232515.4 and China Laid-open Application No. 01130712.9, the installation of a hard disk drive in a computer typically involves use of screws to attach the hard disk drive to a bracket of a computer chassis. Usually, these screws are small enough to make them difficult to be manipulated. It is laborious and time-consuming to manually manipulate the screws. Additionally, because of their small size, the screws are easier to be dropped by an assembler into the computer. Some accidental damage will occur in the computer due to impact of these moving parts, and the like causes.

To address the aforementioned problems, a plurality of mounting apparatuses is invented to reduce the number of needed screws. For example, a pair of detachable rails is attached to opposite sides of a storage device with screws. The storage device slides into and is secured to a drive bracket. However, the screws have to be removed to detach the rails from the storage device before replacing the storage device.

What is desired, therefore, is a mounting apparatus which conveniently and securely holds a storage device in a bracket.

SUMMARY

In one preferred embodiment, a mounting apparatus includes a bracket, a retainer, and a slider. The bracket is for receiving a storage device therein and includes a first sidewall defining two pairs of apertures therein. The slider is slidably attached to the first sidewall and includes two pairs of slideways, and a pair of resilient arms. The retainer is sandwiched between the first sidewall of the bracket and the slider and abutted against by the resilient arms. The retainer includes two pairs of posts sliding along the slideways, and two pairs of pins extending through the apertures to engage the storage device.

Other advantages and novel features will become more apparent from the following detailed description of preferred embodiments when taken in conjunction with the accompanying drawings, in which:

DETAILED DESCRIPTION OF THE INVENTION

Figure 1:
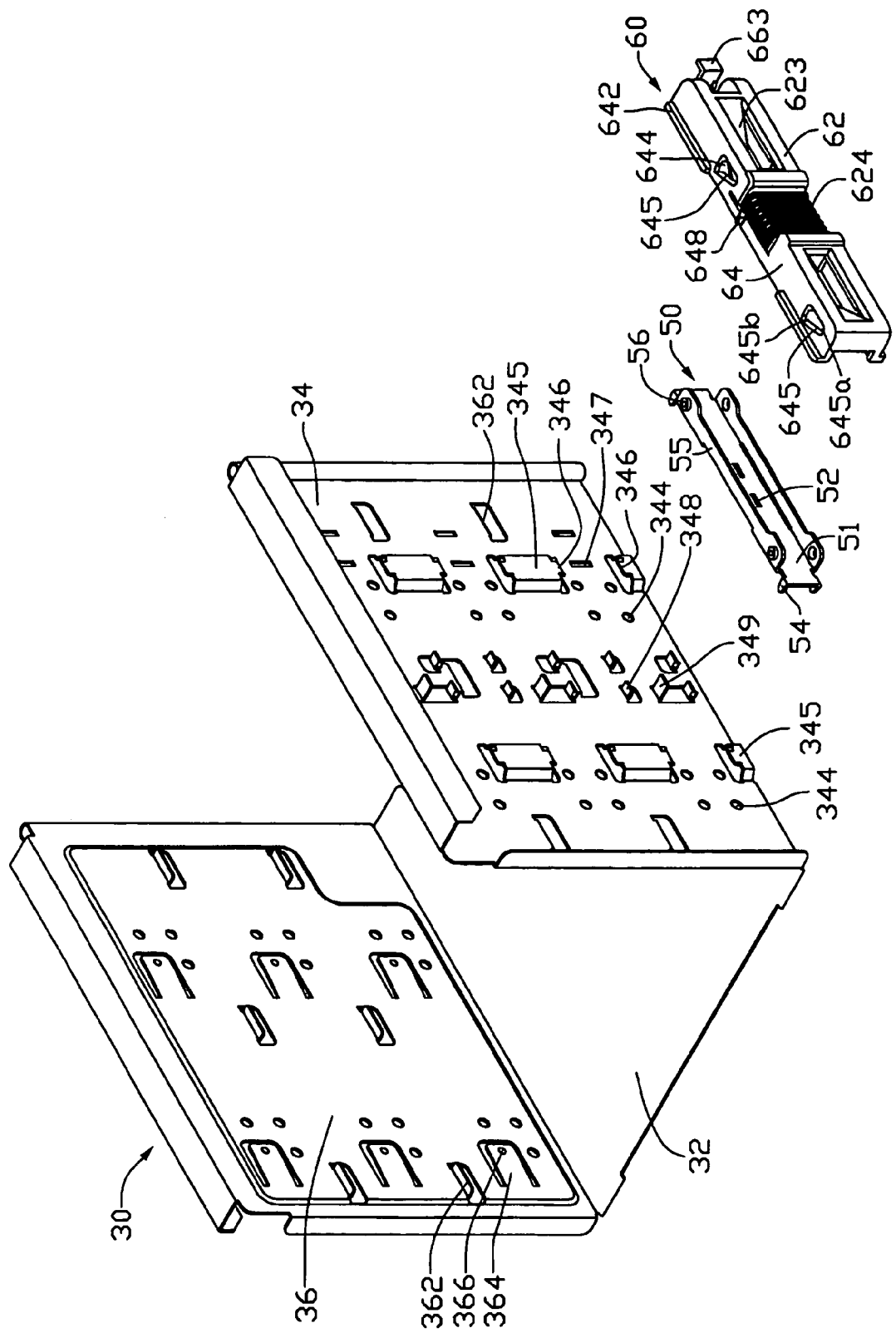
FIG. 1 is an exploded, isometric view of a mounting apparatus in accordance with a preferred embodiment of the present invention.
Figure 3:
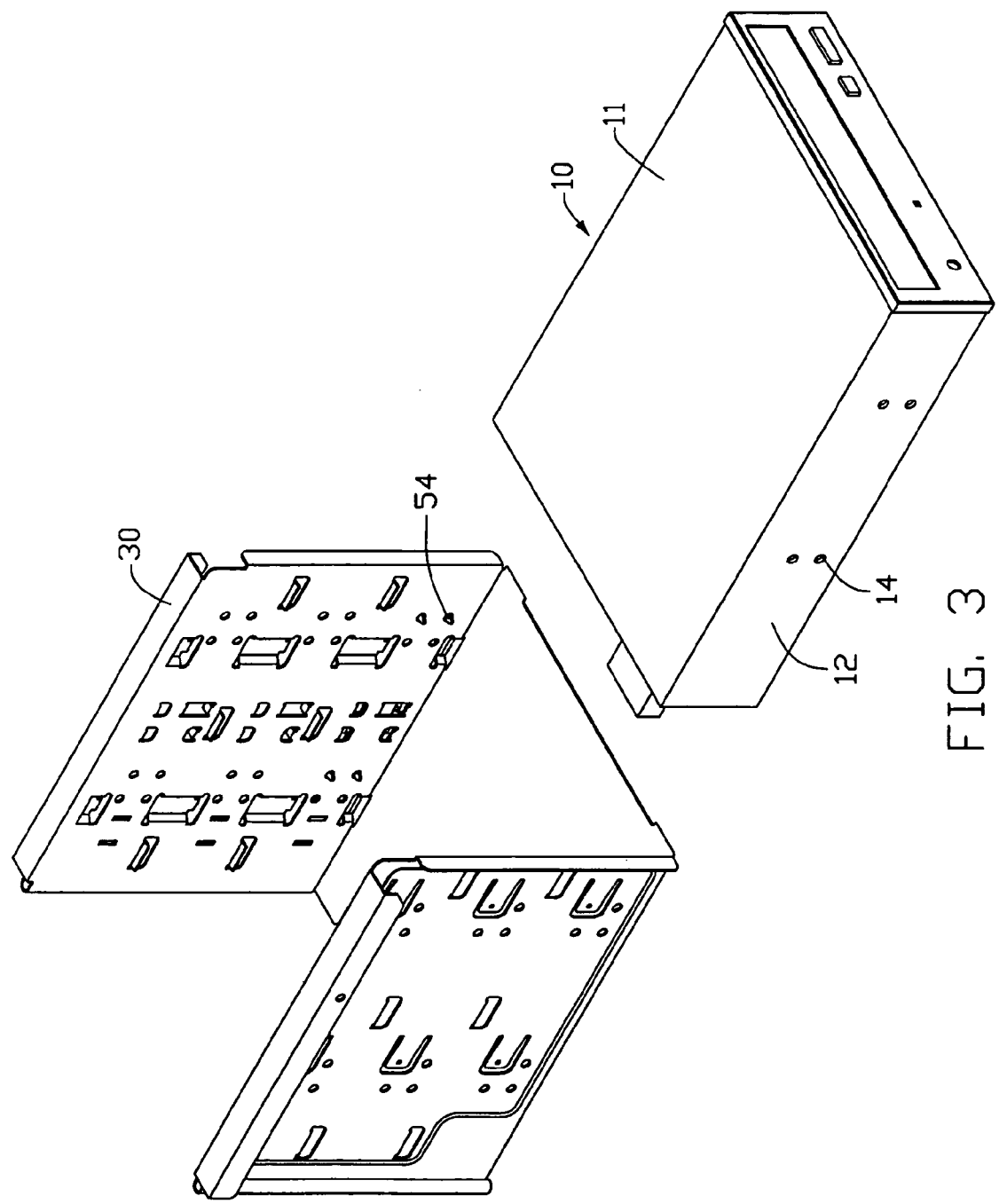
FIG. 3 is an assembled view of the mounting apparatus of FIG. 2, together with a storage device.

Referring to FIGS. 1 and 3, in a preferred embodiment of the invention, a mounting apparatus of an electronic device like a computer is provided for holding a functional device like a storage device 10 of the computer in place. The mounting apparatus includes a bracket 30, a retainer 50, and a slider 60.

The storage device 10 includes a top wall 11, and a pair of sidewalls 12 perpendicular to the top wall 11. Two pairs of spaced fixing holes 14 are defined in each of the sidewalls 12.

Figure 2:
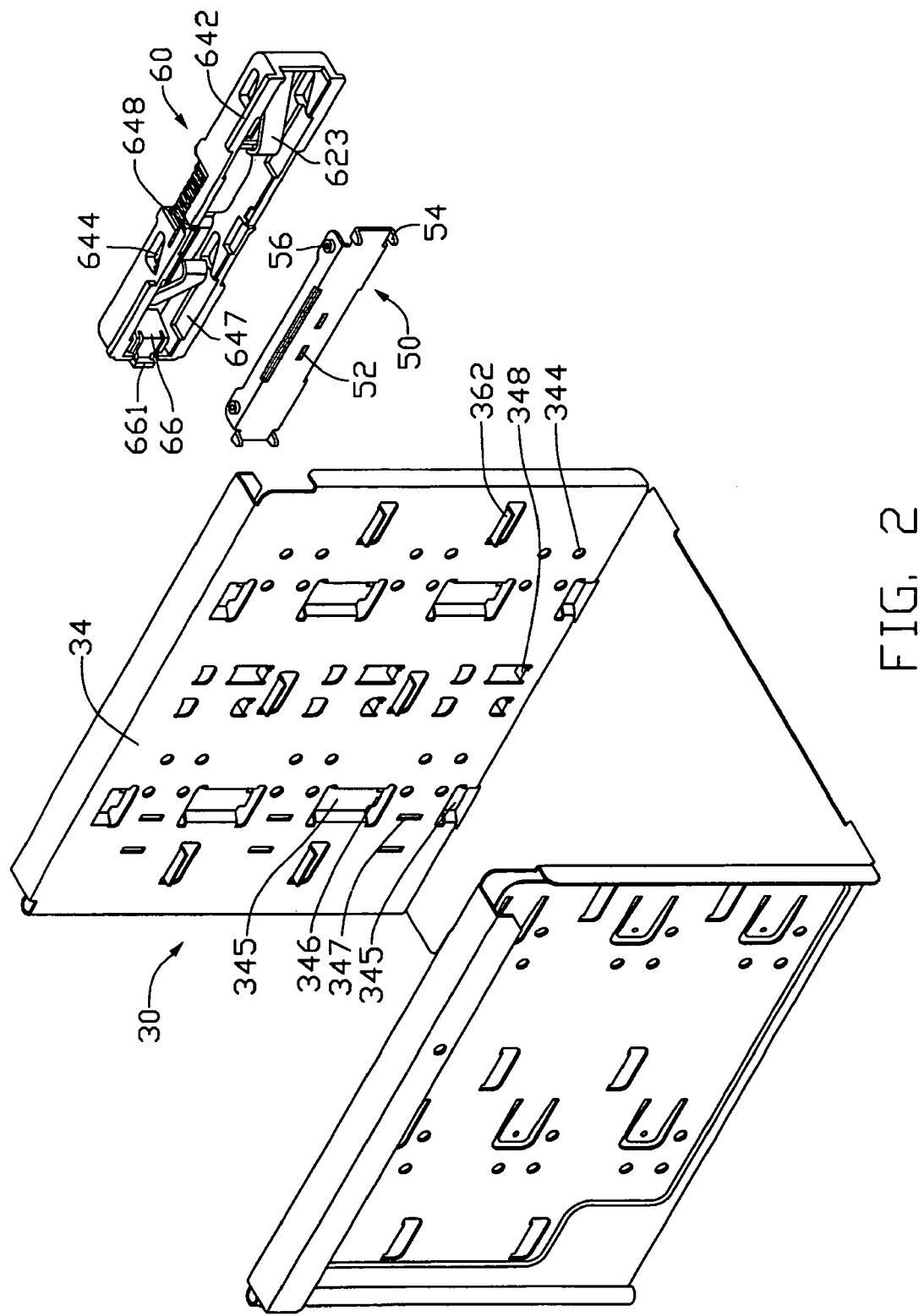
FIG. 2 is similar to FIG. 1, but viewed from another aspect.

Referring also to FIG. 2, the bracket 30 includes a bottom wall 32, a first sidewall 34, and a second sidewall 36. A pair of guiding pieces 362 is punched inwardly and separately from the first and second sidewalls 34, 36, opposite to each other. Two lines of spaced bridges 345 each with a guiding protrusion 346 are punched outwardly from the first sidewall 34 so as to be used as a guide mechanism of the bracket 30. Two lines of spaced guiding tabs 348 are punched outwardly from the first sidewall 34, between the lines of the bridges 345. A locating tab 349 is punched outwardly from the first sidewall 34, between the lines of the guiding tabs 348 so as to be used as another guide mechanism of the bracket 30. A many pairs of apertures 344 in array are defined in the first sidewall 34 besides two ends of the guiding tabs 348, corresponding to the fixing holes 14 of the storage device 10. Many slots 347 in array are defined in a rear portion of the first sidewall 34 beside the apertures. Many pairs of resilient tabs 364 in array extend inwardly from the second sidewall 36 along the horizontal direction. A protrusion 366 extrudes from each of the resilient tabs 364 in alignment with the corresponding aperture 344 of the first sidewall 34.

The retainer 50 includes a rectangle plate 51, and a pair of flanges 55 extended perpendicularly and outwardly from upper and lower edges of the rectangle plate 51 respectively. Many slits 52 in array are defined in the rectangle plate 51, corresponding to the locating tab 349 of the bracket 30. A tip 54 extends perpendicularly at each corner of the rectangle plate 51, corresponding to the apertures 344 of the bracket 30. A pair of posts 56 extends outwardly from end portions of each flange 55. The post 56 can be replaced by another sliding member, such as a block or a protrusion.

The slider 60 is generally box-shaped. The slider 60 includes a vertical wall 62, and a pair of horizontal walls 64 extending inwardly from upper and lower edges of the vertical wall 62 respectively. A pair of resilient arms 623 extends inwardly from two opposite end portions of the vertical wall 62 and the resilient arms 623 symmetrically extend toward each other. Each of the resilient arms has a curved distal end. A handgrip portion 624 is defined in a middle portion of the vertical wall 62 and extends to the horizontal walls 64. A pair of sliding blocks 642 extends from an edge of each of the horizontal walls 64, corresponding to guiding protrusions 346 of the bridges 345 of the bracket 30. A resilient hook 648 extends outwardly from the edge portion of each of the horizontal walls 64 between corresponding guiding blocks 642, engaging with corresponding guiding tabs 348 of the bracket 30. A pair of slideways 644 is formed in each of the horizontal walls 64 besides the handgrip portion 624. A recess 647 is defined in each of the horizontal walls 64 connecting with the corresponding slideway 644. Each of the slideways 644 includes a sloped wall 645. Each of the slopped walls 645 includes a first end 645a near the vertical wall 62, and a second end 645b far away the vertical wall 62. A locator 66 is resiliently formed in a rear portion of the vertical wall 62. The locator 66 includes a plug 661 extruding inwardly therefrom, and a handle 663 extending outwardly therefrom.

Figure 5:
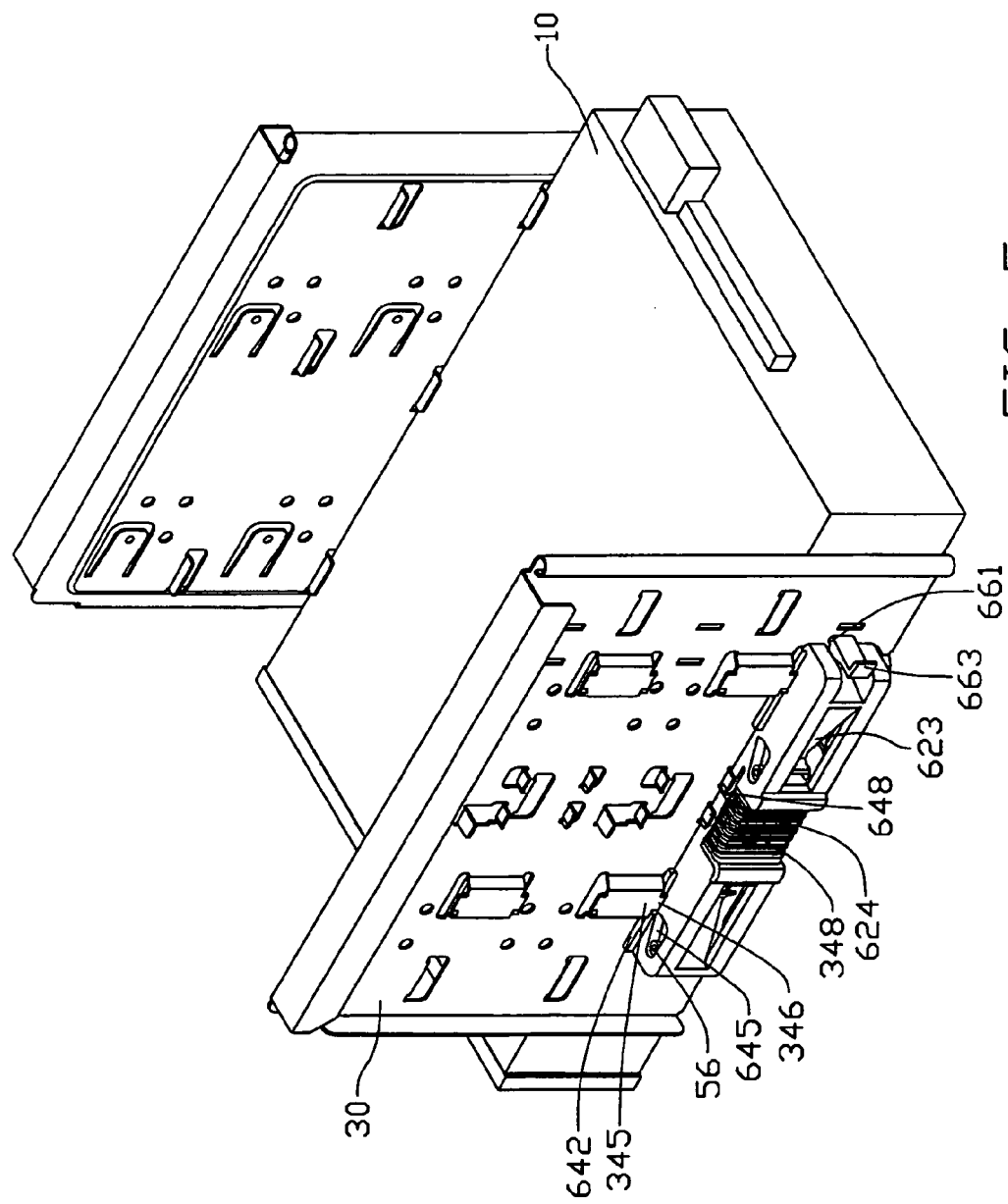
FIG. 5 is similar to FIG. 4, but viewed from another aspect.

Referring to FIGS. 3 and 5, in assembly of the mounting apparatus, the retainer 50 is engaged to the first sidewall 34 of the bracket 30, with the locating tab 349 engaged in one of the slots 52 and the tips 54 in alignment with corresponding apertures 344. The slider 60 is placed on the first sidewall 34, with the hooks 648 sliding between corresponding guiding tabs 348. The guiding blocks 642 of the slider 60 slide along the guiding protrusions 346 of the bridges 345. The sliding posts 56 of the retainer 50 are received in the corresponding slidaways 644 via the corresponding recesses 647. The plug 661 of the slider 60 engages in corresponding slit 347 of the bracket 30. The curved distal ends of the resilient arms 623 slidably contact and abut against the retainer 50. The resilient arms 623 therefore urge the rectangle plate 51 toward the first sidewall 34 of the bracket 30, with the tips 54 extending through corresponding aperture 344 of the bracket 30.

Figure 4:
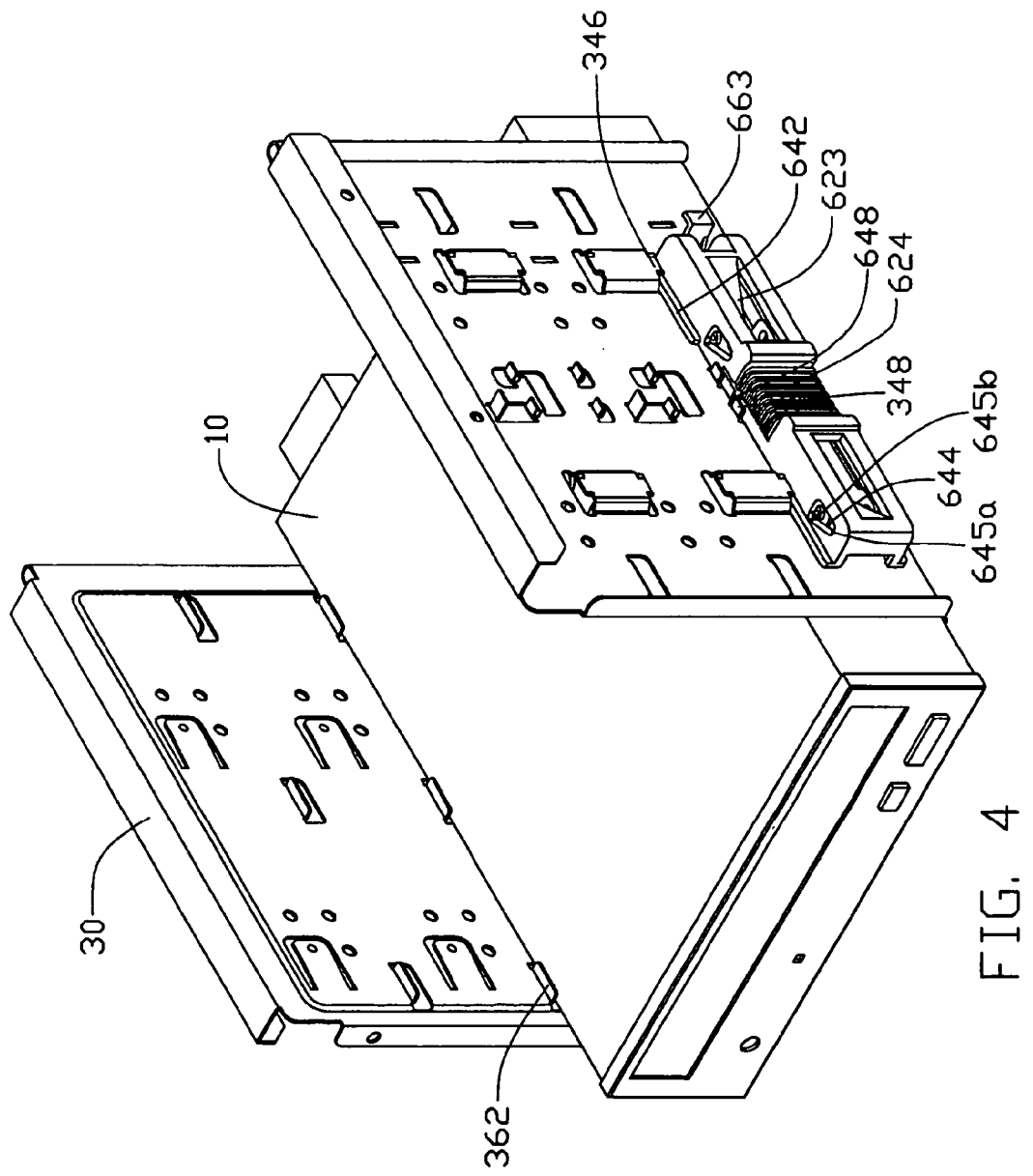
FIG. 4 is an assembled view of the mounting apparatus of FIG. 1, with the storage device installed therein.

In use of the mounting apparatus, FIGS. 4 and 5 show the storage device 10 fixed in the bracket 30. Before installing the storage device 10 into the bracket 30, the handle 663 is drawn outwardly to release the plug 661 from the slot 347 of the bracket 30 by a forefinger of an operator. The handgrip portion 624 is engaged by a thumb of the operator to push the slider 60 rearward, with the guiding blocks 642 moving along corresponding guiding protrusions 346 of the bridges 345 correspondingly. The sliding posts 56 of the retainer 50 slide along corresponding sloped wall 645 from the second end 645b to the first end 645a. The resilient arms 623 are restored to move the retainer 50 away from the first sidewall 34 of the bracket 30. The tips 54 of the retainer 50 disengage from corresponding apertures 344 of the first sidewall 34 of the bracket 30. Then the storage device 10 is moved into the bracket 30, with the guiding pieces 362 engaging on the top wall 11 of the storage device 10 and the resilient tabs 364 abutting the sidewalls 12 of the storage device 10. When a rear pair of fixing holes 14 of the storage device 10 approximately reaches one front pair of the apertures 344 of the bracket 30, the slider 60 is pushed frontward. The sliding posts 56 of the retainer 50 slide along corresponding sloped wall 645 from the first end 645a to the second end 645b. The resilient arms 623 are depressed to urge the retainer 50 toward the first sidewall 34. The tips 54 of the retainer 50 are extended through the apertures 344 to abut the sidewall 12 of the storage device 10. When the fixing holes 14 of the storage device 10 are in alignment with corresponding apertures 344 of the bracket 30, the tips 54 are extended into the fixing holes 14. At the same time, the protrusions 366 of the second sidewall 36 of the bracket engage in the fixing holes 14 of an opposite sidewall of the storage devices 10. The plug 661 of the slider 60 engages in the corresponding slot 347 of the bracket 30. The storage device 10 is fixed in the bracket 30.

The storage device 10 is selectively located in different positions in the bracket 30, so that the bracket 30 is able to receive the storage device 10 in a plurality of selective places therein, with the tips 54 of the retainer 50 engaging in different pairs of the apertures 344 of the bracket 30, the locating tab 349 of the bracket 30 engaging in different slits 52 of the retainer 50, the plug 661 of the slider 60 engaging in different slots 347 of the bracket 30, and the fixing holes 14 of the storage device 10 engaging with different protrusions 366 of the bracket 30. In this case, the retainer 50 therefore can be attached to the slider 60 in a selective place corresponding to a selected place of the storage device 10 in the bracket and is movable in a direction perpendicular to the bracket.

To detach the storage device 10, the handle 663 of the slider 60 is drawn outwardly to separate the plug 661 from the slot 347. The slider 60 is moved rearward, the sliding posts 56 of the retainer 50 slide along the corresponding sloped walls 645 from the second end 645b to the first end 645a. The resilient arms 623 are restored to move the retainer 50 away from the first sidewall 34 of the bracket 30. The tips 54 withdraw from the fixing holes 14 of the storage device 10. The storage device 10 is easily detached from the bracket 30.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A mounting apparatus for a storage device, comprising:
   a bracket for receiving the storage device therein, the bracket comprising a first sidewall, the first sidewall comprising a plurality of pairs of apertures defined therein, a plurality of slots defined therein beside the apertures, and a plurality of bridges punched therefrom;
   a retainer attached to the first sidewall and comprising at least one pair of tips selectively extending in or out of one pair of the plurality of pairs of apertures of the bracket for engaging or disengaging the storage device, the retainer comprising at least one post; and
   a slider resiliently attached to the first sidewall of the bracket and sliding parallelly relative to the first sidewall of the bracket to actuate the retainer moving in a direction perpendicular to the first sidewall of the bracket, the slider comprising at least one block sliding along the corresponding bridges of the bracket, at least one slideway with a slopped wall engaging with said post, a handle with a plug selectively engaging in one of the slots corresponding to the selected pair of the apertures, and at least one resilient arm abutting against the retainer.

2. The mounting apparatus as claimed in claim 1, wherein the bracket further comprises a second sidewall parallel to the first sidewall, at least one resilient tab extends inwardly from the second sidewall, a protrusion protrudes from said resilient tab for engaging the storage device.

3. The mounting apparatus as claimed in claim 1, wherein the bracket further comprises a second sidewall parallel to the first sidewall, a plurality of guiding pieces extends from the first and second sidewall, for engaging a top wall of the storage device.

4. The mounting apparatus as claimed in claim 1, wherein each of the bridges comprises a guiding protrusion extending from an end portion thereof 5. The mounting apparatus as claimed in claim 1, wherein the retainer comprises a rectangle plate, and a pair of flanges extended perpendicularly from edges of the rectangle plate respectively, said post extends from one of the flanges.

6. The mounting apparatus as claimed in claim 5, wherein the first sidewall of the bracket comprises a locating tab extending outwardly therefrom, the rectangle plate comprises a plurality of slits selectively engaging with the locating tab.

7. The mounting apparatus as claimed in claim 1, wherein the slider comprises a vertical wall, and a pair of horizontal walls extending from opposite edges of the vertical wall respectively.

8. The mounting apparatus as claimed in claim 7, wherein the handle is resiliently formed from the vertical wall, the plug extends from a distal end of the handle.

9. The mounting apparatus as claimed in claim 7, wherein a handgrip portion is formed in a middle portion of the vertical wall and extends to the horizontal walls.

10. The mounting apparatus as claimed in claim 7, wherein said resilient arm is integrally formed on the slider and comprises a pair of resilient arms symmetrically extending toward each other from two ends of the vertical wall, each of the resilient arms has a curved distal end to slidably contact the retainer.

11. The mounting apparatus as claimed in claim 7, wherein said sliding block extends from an edge of each of the horizontal walls.

12. The mounting apparatus as claimed in claim 7, wherein said slideway is defined in one of the horizontal walls, a recess communicates with said slideway for said post easily moving into said slideway.

13. The mounting apparatus as claimed in claim 12, wherein the slopped wall comprises a first end near the vertical wall, and a second end far away from the vertical wall.

14. A mounting apparatus for a storage device, comprising:
a bracket for receiving the storage device therein, the bracket comprising a first sidewall, the first sidewall comprising at least one aperture defined therein;
a slider attached to the first sidewall of the bracket and moving in first direction, the slider comprising at least one slideway with a slopped wall, and a pair of resilient arms symmetrically extending toward each other from two ends of the vertical wall, each of the resilient arms having a curved distal end; and
a retainer sandwiched between the slider and the first sidewall of the bracket, the retainer comprising at least one tip, and at least one post sliding along said slideway, the retainer moved in a second direction perpendicular to the first direction under a force provided by the curved distal end of said resilient arm of the slider slidably abutting against the retainer, said tip engaging in said aperture to secure the storage device the bracket.

15. The mounting apparatus as claimed in claim 14, wherein the bracket further comprises a second sidewall parallel to the first sidewall, at least one resilient tab extends inwardly from the second sidewall, a protrusion protrudes from said resilient tab for engaging the storage device.

16. The mounting apparatus as claimed in claim 14, wherein the first sidewall of the bracket comprises a locating tab extending outwardly therefrom, the retainer comprises a rectangle plate defining a plurality of slits selectively engaging with the locating tab.

17. The mounting apparatus as claimed in claim 14, wherein the slider comprises a vertical wall, the vertical wall comprises a handle resiliently formed from the vertical wall, the handle further comprises a plug, the first sidewall of the bracket comprises a plurality of slots defined therein selectively engaging with the plug.

18. The mounting apparatus as claimed in claim 14, wherein the slider further comprises a pair of horizontal walls perpendicular to the vertical wall, said slideway is defined in one of the horizontal walls, a recess communicates with said slideway for said post easily moving into said slideway.

19. An electronic apparatus comprising:
a removable device installable to said electronic apparatus for function extension thereof;
a bracket disposed in said electronic apparatus for receiving said device therein in a plurality of selective places, said bracket comprising at least two guide mechanisms formed therefrom;
a slider removably attachable to said bracket and movable between two positions thereof, said slider capable of engaging with one of said at least two guide mechanisms so as to move under guidance of said one of said at least two guide mechanisms; and
a retainer attached to said slider in a selective place corresponding to a selected place of said device in the bracket and movable in a direction perpendicular to the bracket, the retainer capable of engaging with said device received in said bracket when said slider is in one of said two positions thereof and disengaging from said device when said slider is in the other of said two positions thereof, said retainer capable of engaging with another of said at least two guide mechanisms so as to move under guidance of said another of said at least two guide mechanisms.

20. The electronic apparatus as claimed in 19, wherein a locator extending from said slider is capable of engaging with said bracket so as to position said slider in a selective one of said two positions thereof.

* * * * *